Figure 1:
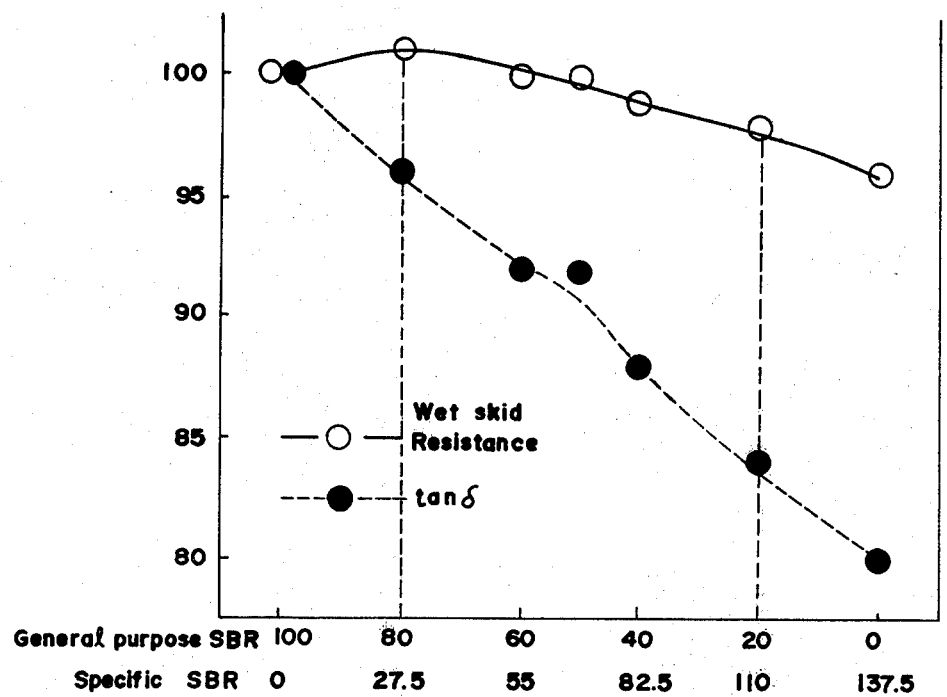

United States Patent [19]

Tokieda et al.

[11] 4,417,005

[45] Nov. 22, 1983

[54] RUBBER COMPOSITIONS FOR TIRE TREADS

[75] Inventors: Akinori Tokieda, Chigasaki; Sumio Takasugi, Hiratsuka, both of Japan

[73] Assignee: The Yokohama Rubber Co., Ltd., Tokyo, Japan

[21] Appl. No.: 348,558

[22] Filed: Feb. 12, 1982

[30] Foreign Application Priority Data

Feb. 13, 1981 [JP] Japan ................................. 56-18904
May 29, 1981 [JP] Japan ................................. 56-80722

[51] Int. Cl.³ .................... C08J 3/18; C08J 3/20; C08K 3/04; C08L 9/06
[52] U.S. Cl. .................... 523/351; 524/495; 524/526
[58] Field of Search ................ 524/526, 495; 523/152, 523/351

[56] References Cited

U.S. PATENT DOCUMENTS

| | | | |
|---|---|---|---|
| 3,596,697 | 8/1971 | Hansley et al. | 524/526 |
| 3,728,300 | 4/1973 | Minekawa et al. | 524/526 |
| 3,938,574 | 2/1976 | Burmester et al. | 524/526 |
| 4,005,053 | 1/1977 | Briggs et al. | 523/351 |
| 4,111,867 | 9/1978 | Komaro et al. | 524/526 |
| 4,154,277 | 5/1979 | Sato et al. | 524/526 |

*Primary Examiner*—Allan Lieberman
*Attorney, Agent, or Firm*—Jordan and Hamburg

[57] ABSTRACT

A rubber composition comprising a specific extender oil-extended styrene.butadiene copolymer rubber, at least one other diene rubber and, as required, carbon black, the rubber composition being useful in the preparation of tire treads having decreased rolling resistance without decreasing braking performance. This invention also relates to a specific two-step mixing method for preparing a rubber composition for producing tire treads having further improved rolling resistance and like properties.

4 Claims, 2 Drawing Figures

RUBBER COMPOSITIONS FOR TIRE TREADS

This invention relates to a rubber composition for tire treads having low rolling resistance and to a method of preparing the same. More particularly, it relates to an excellent rubber composition for use in the production of tire treads having low rolling resistance and eliminating the drawback that conventional tire treads decrease in braking performance or wet skid resistance on wet roads, the rubber composition being prepared by mixing together (I) a specific oil-extended styrene-butadiene copolymer rubber or a mixture thereof with at least one diene rubber such as an ordinary styrene-butadiene copolymer rubber, polyisoprene rubber (and/or natural rubber) with (II) usual additives such as a curing agent or carbon black by the use of a conventional mixing method; and it also relates to a more excellent rubber composition prepared by mixing said materials (I) and (II) together by the use of a specific two-step mixing method and to the specific two-step mixing method. The specific extender oil-extended styrene-butadiene copolymer rubber (hereinafter referred to as "specific SBR") has a Mooney viscosity ($ML_{1+4}$, 100° C.) of at least 53, preferably 53–80, and is prepared by extending with an extender oil a styrene-butadiene copolymer rubber having a styrene content of at least 20% by weight and up to 20% of 1,2-vinyl bonding units in the butadiene portions. The specific SBR is a specific oil extended SBR for use as one of the essential starting materials in this invention.

The extender oils used herein may preferably be an aromatic oil (V.G.C. 0.900–0.999).

The development of automobiles having low fuel consumption has now been intensively promoted from the view-point of economy and resources. Under such circumstances, a decrease in rolling resistance has been tried on tires which are an important part of automobiles. However, such conventional trial has been mainly directed to a decrease in hysteresis loss of the cap tread portion of a tire, which portion is the largest in volume in the tire and is made of a rubber having potentially a large hysteresis loss. For this purpose, rubber compositions for producing such conventional cap tread portions have heretofore formed of polymers having small loss elastic modulus such as polyisoprene rubber (including natural rubber). However, the rubber compositions formed of such polymers will produce cap tread portions having decreased braking performance on wet roads. Even if they contain an increased amount of a reinforcing material such as carbon black and of a plasticizer such as an oil in attempts to produce therefrom rubber products having satisfactory braking performance on wet roads, they will not produce rubber products having as satisfactory low rolling resistance as expected nor will they exhibit fully preferable effects. Under the present circumstances the braking performance of tires has come to be not negligible even if they are ones having low rolling resistance (as is seen from the enforcement of Uniformity Tire Quality Grading in U.S.A.) and, therefore, attempts have been made to decrease the weight of tires to be produced and the hysteresis loss of rubber portions other than the cap tread portions of the tires in order to decrease rolling resistance without decreasing braking performance in the tires. However, such attempts will attain a slight decrease in rolling resistance and there is still sought a rubber material which will produce the cap tread portion having a decreased hystersis loss without decreasing braking performance.

The present inventors were interested in styrene-butadiene copolymer rubber (SBR) and made intensive studies (for example, refer to Experiments 1–4 described later) in attempts to obtain rubber compositions which will produce tire treads having decreased rolling resistance without imparing braking performance, that is wet skid resistance, and, as the result of their studies, they found that such rubber compositions may be obtained by using as the essential rubber ingredient a SBR, extended with oil, in which the styrene content is at least 20% by weight and 1,2-butadiene bonding units are not more than 20%, the oil extended SBR or the specific SBR having a Mooney viscosity ($ML_{1+4}$, 100° C.) of at least 53; they also found that difficulties in practical use of the specific SBR due to its high Mooney viscosity may be overcome by using as the essential rubber ingredients 20–80 parts by weight of the specific SBR, calculated as the extender oil-free SBR, and 80–20 parts by weight of either at least one other diene rubber such as a conventional SBR (The conventional SBR is hereinafter referred to as "general purpose SBR") but it may be extended with an extender oil if desired.) or a mixture of the general purpose SBR with 0–20 parts by weight of polyisoprene rubber (and/or natural rubber); and they further found that, surprisingly, the starting materials (rubber ingredient(s) and additives) for the rubber composition may be blended together by the use of a specific two-step blending method to obtain a specific rubber composition which will produce tire treads having a further remarkably decreased hysteresis loss with the wet skid resistance being kept equal as compared with those produced from a rubber composition prepared by blending together the same starting materials as above by the use of a conventional ordinary mixed method. This invention is based on these findings.

The aforementioned specific two-step blending method is known for its improving effect on various properties from, for example, Japanese Patent Application Laid-Open Gazette No. 50-112445 and "Rubber Chemistry and Technology" Vol. 40, 48(1974) by A. K. Sircar, T. G. Lamond and P. E. Pinter. In this invention, however, the specific SBR, the general purpose SBR or polyisoprene rubber (including natural rubber) as the main rubber ingredients, carbon black and other necessary additives, may be mixed together by the use of the specific blending method, to obtain a specific rubber composition which will produce tire treads having an unexpected remarkably decreased hysteresis loss and satisfactory wet skid resistance, these properties being excellently balanced together. Thus, this invention makes it possible to provide rubber compositions which will produce tire treads having both a small hysteresis loss (which improves low fuel consumption) as compared with conventional ones and satisfactory wet skid resistance, these properties being balanced with each other.

The rubber compositions of this invention, comprise as the rubber ingredient at least 20 parts, preferably 20–80 parts by weight of the specific SBR, calculated as SBR (extender oil-free), and the balance, preferably 80–20 parts by weight of, at least one other diene rubber. For example, if the specific SBR contains an extender oil in an amount of 37.5 parts by weight per 100 parts by weight of rubber ingredient, then it follows that the 20–80 parts by weight of rubber ingredient are supplied from 27.5–110 parts by weight of the specific SBR. The 80–20 parts by weight of at least one other diene rubber may consist of, for example, up to 80, preferably 10–70, parts by weight of the general purpose SBR and up to 20, preferably up to 10, parts by weight of polyisoprene rubber (including natural rubber). In any event throughout the specification, the total of the rubber ingredients is 100 parts by weight. The use of less than 20 parts by weight of the specific SBR, calculated as the rubber ingredient, will not exhibit the effects aimed at by this invention, while the use of more than 80 parts by weight of the specific SBR, calculated as the rubber ingredient, will increase the Mooney viscosity of the resulting rubber composition thereby remarkably aggravating the workability thereof. Thus, the use of such amounts is undesirable.

The amount of carbon black which may be used in this invention, is not particularly limited but may be preferably 40–70 parts by weight per 100 parts by weight of starting rubber ingredients. The use of less than 40 parts by weight of carbon black will result in the production of tire treads having satisfactory physical properties, while the use of more than 70 parts by weight thereof will result in the production of tire treads having approximately the same resilience as those prepared using a less amount of carbon black by the use of an ordinary mixing method although it will exhibit some effects in cases where the specific two-step blending method to be detailed later is used. Any carbon black may be used in this invention, however, it is preferable that carbon black for use in the production of tire treads having low rolling resistance may preferably have an $I_2$ adsorption of 60–130 mg/g and a DBP (dibutyl phthalate) absorption of up to 130 ml/100 g. The use of carbon black having an $I_2$ adsorption less than 60 mg/g will result in the production of tire treads having too small a hysteresis loss and degraded wet skid resistance, while the use of carbon black having an $I_2$ adsorption of more than 130 mg/g is undesirable in that the resulting tire treads will have a greater hysteresis loss with no decrease in rolling resistance being expected.

The starting materials (rubber ingredients and additives) for use in the rubber composition of this invention may be blended together by the use of a usual blending method to obtain a rubber composition which will produce tire treads having decreased rolling resistance aimed at by this invention, however, a further decreased rolling resistance in tire treads will be attained by using the following two-step blending method.

In the preparation of a rubber composition from as the main starting materials 20–80 parts by weight of the specific SBR, calculated as the rubber ingredient, 80–20 parts by weight of at least one other diene rubber as the rubber ingredient, the total of these rubber ingredients being 100 parts by weight, and 40–70 parts by weight of carbon black, the two step blending method according to this invention is characterized in that from more than 40 to 90 parts by weight of said rubber ingredients are incorporated with the total of said carbon black and mechanically mixing the resulting mixture together in the first step, after which the resulting mixture so mixed is incorporated with the balance (10–less than 60 parts by weight) of said rubber ingredients and mechanically blending the whole together in the second step, thereby to obtain a specific rubber composition which will produce tire treads having further decreased rolling resistance as compared with those produced from a rubber composition having the same constitution by the usual one-step mixing method. It is preferable that carbon black used herein have an $I_2$ adsorption of 60–130 mg $I_2$/g and a DBP absorption of up to 130 ml/100 g.

The additives used with the rubber ingredients in this invention, may be zinc oxide, stearic acid, a vulcanization accelerator, sulphur and the like in addition to carbon black. These additives may be used in any desired amounts.

The rubber compositions prepared according to this invention will form rubber products having low tan $\delta$ without a decrease in wet skid resistance when cured. Thus, if they are used as material for cap treads of tires, the resulting tires will have decreased rolling resistance without decreasing braking performance on wet roads.

This invention will be better understood by the following experiments, examples, reference examples and comparative examples wherein all the parts and percentages are by weight unless otherwise specified.

EXPERIMENTS 1–4

There were provided four kinds of SBR's A, B, C and D (each containing 37.5 parts of an extender oil (V.G.C. 0.98) per 100 parts of rubber ingredients) having the styrene contents, 1,2-butadiene bonding units and Mooney viscosities ($ML_{1+4}$, 100° C.) respectively as shown in the following Table.

| | Details of Oil-Extended SBR's | | | |
| --- | --- | --- | --- | --- |
| | SBR A | SBR B | SBR C | SBR D |
| Mooney viscosity ($ML_{1+4}$, 100° C.) | 46 | 52 | 48 | 55 |
| Styrene content (%) | 23.5 | 25 | 18 | 25 |
| 1,2-butadiene bonding unit (%) | 18 | 36 | 14 | 14 |

The styrene contents and 1,2-butadiene bonding units of the oil-extended SBR's were measured by the known method by the use of an infra-red spectrometer produced by Hitachi Works, Japan. The Mooney viscosities were determined from JIS (Japanese Industrial Standard) K 6300.

COMPARATIVE EXAMPLES 1–4

Then, as indicated in the following Table 1, each of the oil-extended SBR's was blended with carbon black, sulphur and the like in the respective fixed amounts to obtain four rubber compositions which were measured for their Mooney viscosity, cured at 160° C. for 20 minutes and then measured for their tensile strength, elongation at break, 300% modulus, JIS hardness, wet skid resistance, loss tangent (tan $\delta$, 50° C.) and resilience (Lüpke rebound, 50° C.). The results are as shown in Table 1.

TABLE 1

| | Comparative Example 1 | Comparative Example 2 | Comparative Example 3 | Comparative Example 4 |
| --- | --- | --- | --- | --- |
| SBR A | 137.5 | | | |
| SBR B | | 137.5 | | |
| SBR C | | | 137.5 | |

TABLE 1-continued

|  | Comparative Example 1 | Comparative Example 2 | Comparative Example 3 | Comparative Example 4 |
| --- | --- | --- | --- | --- |
| SBR D |  |  |  | 137.5 |
| Zinc oxide | 3.0 | 3.0 | 3.0 | 3.0 |
| Stearic acid | 1.5 | 1.5 | 1.5 | 1.5 |
| Carbon black (N 339) | 75.0 | 75.0 | 75.0 | 75.0 |
| Vulcanization accelerator | 1.4 | 1.4 | 1.4 | 1.4 |
| Sulphur | 2.0 | 2.0 | 2.0 | 2.0 |
| Mooney viscosity ($ML_{1+4}$, 100° C.) | 72 | 76 | 81 | 97 |
| Tensile strength ($Kg/cm^2$) | 205 | 200 | 205 | 210 |
| Elongation (%) at break | 450 | 500 | 490 | 480 |
| 300% modulus ($Kg/cm^2$) | 125 | 115 | 110 | 120 |
| Hardness (JIS) | 65 | 65 | 64 | 64 |
| Wet skid resistance (index number) | 102 | 104 | 95 | 100 |
| Tan δ, 50° C. | 0.26 | 0.27 | 0.22 | 0.22 |
| Resilience (%) (Lupke rebound, 50° C.) | 46 | 42 | 49 | 52 |

In Table 1, Mooney viscosity indicating the viscosity of uncured rubber material was measured in accordance with JIS K 6300; tensile strength, elongation at break, and 300% modulus were measured in accordance with JIS K 6301; in addition, tan δ (loss tangent) was measured by cutting cured rubber to obtain test pieces in the strip form, 10.0 mm long×5.0 mm wide×2.0 mm thick, and the vibrating the thus obtained test pieces under the conditions (frequency, 10 Hz; initial strain, 5% elongation; and dynamic strain, 1%) in an atmosphere at 50° C. in view of the temperature of the tire tread portion at the time of measuring rolling resistance in order to measure the loss tangent by the use of a visco-elasticity spectrometer manufactured by Iwamoto Works. From the fact that 90-95% of rolling resistance is hysteresis loss and hysteresis loss (H) is expressed by the following formula it follows that low tan δ means decreased rolling resistance.

$$H = \sum_i (Ui \times Vi \times \sin \delta i) \simeq \sum_i (Ui \times Vi \times \tan \delta i)$$

(In cases where δ is small, sin δ ≃ tan δ)
wherein Ui indicates strain energy at various portions, Vi volume at various portions and tan δi loss tangent at various portions.

Likewise, Lüpke rebound is measured in an atmosphere at 50° C. in view of the temperature of the tire tread portion at the time of measuring rolling resistance. Thus, higher resilience (Lüpke rebound) of tires indicates lower rolling resistance thereof.

Wet skid resistance as a measure indicating braking performance on wet roads is expressed by an index number assuming the value (for SBR D in Experiment 4) to be 100, the value being measured by the use of a British portable skid tester on a wet road prepared by using a safety walk (outdoor type B. Black) as a road and applying distilled water to the surface thereof.

As is seen from Table 1, the use of SBR having a styrene content of less than 20% by weight will result in the production of tire treads having high resilience and low tan δ whereby a decrease in rolling resistance is expected but a great decrease in wet skid resistance is undesirably caused (Experiment 3). The use of SBR containing more than 20% of 1,2-butadiene bonding units will result in the production of tire treads which have increased wet skid resistance but have low resilience and high tan δ, this proving that such SBR is undesirable as a polymer for use in the preparation of cap treads of tires having low rolling resistance (Experiment 2). Further, the use of oil-extended SBR having a Mooney viscosity of less than 53 at 100° C. will also result in the production of tire treads having decreased resilience and high tan δ, this proving that such SBR is undesirable for the purpose of this invention (Experiments 1-3).

As is seen from the foregoing, it is expected to obtain rubber compositions which will produce tire treads having decreased rolling resistance without decreasing braking performance on wet roads by using the specific SBR in said rubber compositions, however, such rubber compositions are very disadvantageous in workability because of their high Mooney viscosity and they are therefore difficult to put to practical use. The present inventors made studies of the combined use of the specific SBR and at least one other diene rubber and then found that said combined use eliminates the aforesaid disadvantage and will result in the production of rubber compositions which will give tire treads having decreased rolling resistance without decreasing braking performance on wet roads. More particularly, the preferable illustrative rubber compositions of this invention may comprise 27.5-110 parts of a specific SBR (20-80 parts as the rubber ingredient since the specific SBR contains 37.5 parts of an extender oil in this illustrative case), preferably 41.25-82.5 parts thereof (30-60 parts as the rubber ingredient), and 80-20 parts, preferably 10-70 parts, of a general purpose SBR for example as well as up to 20 parts, preferably up to 10 parts, of polyisoprene rubber and/or natural rubber, the rubber ingredients totalling 100 parts; they may further comprise 40-70 parts of carbon black as a reinforcing material. Particularly preferable is carbon black having an $I_2$ adsorption of 60-130 mg $I_2$/g and a DBP absorption of up to 130 ml/100 g. As mentioned before, curable rubber compositions comprising the above mentioned various ingredients are practically satisfactory in workability and will produce tire treads having decreased rolling resistance without decreasing braking performance on wet roads. Further, as mentioned before, the use of the two-step blending method according to this invention will result in a specific rubber composition which will produce tire treads having further decreased rolling resistance without degrading the other properties thereof.

EXAMPLES 1-7 AND COMPARATIVE EXAMPLES 1-4

The following Table 2 indicates the Examples and Comparative Examples in which the general purpose SBR used was one [styrene content, 23.5%, 1,2-butadiene bonding units, 18%; and Mooney viscosity, 46 ($ML_{1+4}$, 100° C.)] produced under the trademark of NIPOL 1712 by Nippon Zeon Co. and the specific SBR used was an oil extended SBR containing 37.5 parts per 100 parts of the rubber ingredient.

The rubber compositions were obtained as follows.

In each of the Examples and Comparative Examples, the starting materials shown in Table 2 were mixed together on a B-type Banbury mixer and then on 8-inch rolls. More particularly, the whole of the starting rubber ingredient(s) was (were) mixed for 10 seconds on the Banbury mixer wherein the initial temperature of the side wall was 50° C. and the r.p.m. (revolutions per minute) of the rotor was 80, incorporated with the carbon black and the additives other than the sulphur and vulcanization accelerator and then mixed together for 4 minutes including said 10 seconds, after which said materials so mixed together were incorporated with the sulphur and vulcanization accelerator on the 8-inch rolls controllably maintained at 50° C. and blended together for 4 minutes to obtain a rubber composition. As shown in Table 2, some of the rubber compositions so obtained were cured at 160° C. for 15 minutes and the other at 160° C. for 20 minutes as indicated in Table 2. In Table 2, the Mooney viscosities were measured in accordance with JIS K 6300, the tensile strengths in accordance with JIS K 6301, the wet skid resistances by the use of a British portable skid tester and the tan δ's by the use of a visco-elasticity spectrometer as mentioned before. The wet skid resistances are expressed by an index number on the assumption that the value for the wet skid resistance of Comparative Example 1 is 100. The tan δ's are expressed by an index number on the assumption of the tan δ of Comparative Example 1 being 100 and the indexes are described in the parentheses in Table 2. Further, the resiliences were measured in the same manner as in said Experiments.

FIG. 1 indicates two graphs showing wet skid resistances (expressed by the symbol ○ ) and tan δ's (expressed by the symbol ●), the ordinate and abscissa in the Figure indicating the index number and the blending ratio of the general purpose SBR to the specific SBR and the graphs indicating the relationship between the index number and the blending ratio. Table 2 contains various data for Examples 1-7 and Comparative Examples 1-4.

As is seen from FIG. 1, the use of 27.5-110 parts of the specific SBR (this SBR containing 37.5 parts of the extender oil per 100 parts of the rubber ingredients) will increase the resilience and decrease the tan δ substantially without decreasing the wet skid resistance in the resulting tire treads. However, the use of less than 27.5 parts of the specific SBR will not increase the resilience or decrease the tan δ to a satisfactory extent. On the other hand, the use of more than 110 parts thereof will increase the resilience and satisfactorily decrease the tan δ but it will disadvantageously decrease the wet skid resistance in the resulting tire treads; further, it will increase the Mooney viscosity in the resulting rubber composition as is seen from the data on Mooney viscosity in Table 2, thereby aggravating the workability thereof and making the practical use thereof difficult. As is seen from Comparative Example 3, the use of more than 20 parts (30 parts used in this case) of natural rubber (polyisoprene rubber) will undesirably decrease the wet skid resistance in the resulting tire treads. The combined use of the general purpose SBR and natural rubber as the rubber ingredients will not fully increase the resilience or decrease the tan δ but will undesirably decrease the wet skid resistance in the resulting tire treads as compared with the use of at least the specific SBR. Further, the combined use of the specific SBR and natural rubber will greatly increase the resilience and greatly decrease the tan δ although it will somewhat decrease the wet skid resistance in the resulting tire treads; furthermore, in this case, it will not greatly increase the Mooney viscosity in the resulting rubber composition thereby making the practical use thereof possible.

TABLE 2

| Starting Materials | Com. Ex. 1 | Ex. 1 | Ex. 2 | Ex. 3 | Ex. 4 | Ex. 5 | Com. Ex. 2 | Ex. 6 | Com. Ex. 3 | Com. Ex. 4 | Ex. 7 |
|---|---|---|---|---|---|---|---|---|---|---|---|
| General purpose SBR (NIPOL 1712) | 137.5 | 110.0 | 82.5 | 68.75 | 55.0 | 27.5 | | 68.75 | 55.0 | 110.0 | |
| Specific SBR (SBR D) | | 27.5 | 55.0 | 68.75 | 82.5 | 110.0 | 137.5 | 41.25 | 41.25 | | 110.0 |
| Natural rubber (RSS No. 4) | | | | | | | | 20.0 | 30.0 | 20.0 | 20.0 |
| Zinc oxide | 4.0 | 4.0 | 4.0 | 4.0 | 4.0 | 4.0 | 4.0 | 4.0 | 4.0 | 4.0 | 4.0 |
| Stearic acid | 1.5 | 1.5 | 1.5 | 1.5 | 1.5 | 1.5 | 1.5 | 1.5 | 1.5 | 1.5 | 1.5 |
| Carbon black (N 339) | 68.75 | 68.75 | 68.75 | 68.75 | 68.75 | 68.75 | 68.75 | 68.75 | 68.75 | 68.75 | 68.75 |
| Extender oil (aromatic oil) | — | — | — | — | — | — | — | 7.5 | 11.25 | 7.5 | 7.5 |
| Vulcanization accelerator (CBS) | 1.38 | 1.38 | 1.38 | 1.38 | 1.38 | 1.38 | 1.38 | 1.38 | 1.38 | 1.38 | 1.38 |
| Sulphur | 2.54 | 2.54 | 2.54 | 2.54 | 2.54 | 2.54 | 2.54 | 2.54 | 2.54 | 2.54 | 2.54 |
| Rubber composition Mooney viscosity ($ML_{1+4}$, 100° C.) | 69 | 74 | 76 | 76 | 78 | 83 | 89 | 69 | 67 | 65 | 74 |
| Properties of cured rubber product | | | 160° C. × 20' cured | | | | | | 160° C. × 15' cured | | |
| Tensile strength (Kg/cm$^2$) | 230 | 215 | 220 | 210 | 210 | 205 | 200 | 215 | 205 | 200 | 180 |
| Elongation at break (%) | 465 | 425 | 435 | 420 | 435 | 435 | 430 | 455 | 435 | 420 | 420 |
| 300% modulus (Kg/cm$^2$) | 130 | 140 | 140 | 140 | 130 | 125 | 125 | 130 | 135 | 140 | 130 |
| Hardness (JIS) | 62 | 63 | 63 | 62 | 63 | 62 | 62 | 62 | 62 | 63 | 63 |
| Wet skid resistance (index number) | 100 | 101 | 100 | 100 | 99 | 98 | 96 | 98 | 95 | 98 | 96 |
| Tan δ, 50° C. | 0.25 | 0.24 | 0.23 | 0.23 | 0.22 | 0.21 | 0.20 | 0.22 | 0.21 | 0.23 | 0.19 |
| (Index number for tan δ) | (100) | (96) | (92) | (92) | (88) | (84) | (80) | (88) | (84) | (92) | (76) |
| Resilience (Lupke rebound, 50° C.) (%) | 48 | 49 | 49 | 49 | 50 | 52 | 53 | 51 | 52 | 50 | 55 |

Note
Ex.: Example
Com. Ex.: Comparative Example

EXAMPLES 8-20 AND COMPARATIVE EXAMPLES 5-13

The starting materials as shown in Table 3 were kneaded together on a B type Banbury mixer and then on 8-inch rolls. The mixing operation will be detailed hereinbelow.

In the first step, some of the starting rubber materials as shown in the first step of Table 3 were mixed together for 10 seconds on the Banbury mixer wherein the initial temperature of the side wall was 50° C. and the r.p.m. of the rotor was 80, incorporated with the carbon black and the additives as shown in the first step of Table 3 and mixed together for 4 minutes including said 10 seconds in Comparative Examples 5-9 and for 2 minutes including said 10 seconds in Examples 8-20 and the other Comparative Examples. Then, in the second step, the whole so mixed together was further incorporated with the balance of the starting rubber material as shown in the second step of Table 3 and mixed together for 2 minutes (Comparative Examples 5-9 did not comprise the second step).

Lastly, the thus mixed mass from the second step was incorporated with the sulphur and vulcanization accelerator as shown in Table 3 on the 8-inch rolls controllably maintained at 50° C. and then mixed together for 4 minutes to obtain a rubber composition. The thus obtained rubber compositions were press cured at 160° C. for 15 minutes in Example 19 and Comparative Example 9 and at 160° C. for 20 minutes in the other Examples and Comparative Examples. The properties of the thus cured rubber products are as shown in Table 3. The rubber compositions in Comparative Examples 7-13 are within the scope of this invention, but they were used as comparative ones to show the effects of the two-step mixing method according to this invention.

TABLE 3

| | Starting materials | Com. Ex. 5 | Com. Ex. 6 | Com. Ex. 7 | Com. Ex. 8 | Com. Ex. 9 | Com. Ex. 10 | Ex. 8 | Ex. 9 | Ex. 10 | Ex. 11 | Ex. 12 |
|---|---|---|---|---|---|---|---|---|---|---|---|---|
| First step | General purpose SBR (NIPOL 1502) | — | 100 | 80 | 50 | 30 | 45 | 40 | 30 | 20 | 10 | — |
| | Specific SBR (SBR D) | 137.5 | — | 27.5 | 68.75 | 68.75 | 68.75 | 68.75 | 68.75 | 68.75 | 68.75 | 68.75 |
| | Natural rubber (RSS No. 4) | — | — | — | — | 20 | — | — | — | — | — | — |
| | Zinc oxide | 4 | 4 | 4 | 4 | 4 | 4 | 4 | 4 | 4 | 4 | 4 |
| | Stearic acid | 1.5 | 1.5 | 1.5 | 1.5 | 1.5 | 1.5 | 1.5 | 1.5 | 1.5 | 1.5 | 1.5 |
| | Carbon black (N 339) | 70 | 70 | 60 | 60 | 60 | 60 | 60 | 60 | 60 | 60 | 60 |
| | Aromatic oil | — | 37.5 | 16.25 | 5 | 5 | 5 | 5 | 5 | 5 | 5 | 5 |
| | Antioxidant (Sanloflex 13) | 1 | 1 | 1 | 1 | 1 | 1 | 1 | 1 | 1 | 1 | 1 |
| Second step | General purpose SBR (NIPOL 1502) | — | — | — | — | — | 5 | 10 | 20 | 30 | 40 | 50 |
| | Specific SBR (SBR D) | — | — | — | — | — | — | — | — | — | — | — |
| Cure | Sulphur | 2.54 | 2.54 | 2.54 | 2.54 | 2.54 | 2.54 | 2.54 | 2.54 | 2.54 | 2.54 | 2.54 |
| | Vulcanization accelerator (BS) | 1.38 | 1.38 | 1.38 | 1.38 | 1.38 | 1.38 | 1.38 | 1.38 | 1.38 | 1.38 | 1.38 |
| Properties of cured products | Resilience (Lupke rebound, 50° C.) (%) | 50 | 42 | 51 | 52 | 53 | 52 | 53 | 54 | 55 | 57 | 58 |
| | Wet skid resistance (Safety walk, 25° C.) | 101 | 105 | 103 | 100 | 99 | 100 | 99 | 101 | 100 | 100 | 100 |
| | Pico abrasion ($\times 10^{-3}$ cc) | 19 | 23 | 22 | 24 | 24 | 22 | 23 | 24 | 23 | 24 | 23 |
| | Tensile strength (Kg/cm$^2$) | 215 | 195 | 225 | 215 | 215 | 230 | 235 | 230 | 230 | 235 | 220 |
| | Elongation at break (%) | 510 | 565 | 520 | 485 | 550 | 530 | 535 | 515 | 490 | 510 | 450 |
| | 300% modulus (Kg/cm$^2$) | 114 | 94 | 108 | 120 | 95 | 120 | 115 | 119 | 127 | 127 | 125 |
| | Tan δ, 50° C. | 0.22 | 0.29 | 0.22 | 0.21 | 0.20 | 0.21 | 0.19 | 0.18 | 0.17 | 0.16 | 0.13 |

| | Starting materials | Ex. 13 | Ex. 14 | Ex. 15 | Ex. 16 | Ex. 17 | Ex. 18 | Ex. 19 | Ex. 20 | Com. Ex. 11 | Com. Ex. 12 | Com. Ex. 13 |
|---|---|---|---|---|---|---|---|---|---|---|---|---|
| First step | General purpose SBR (NIPOL 1502) | 50 | 50 | 50 | 50 | 50 | 25 | — | 80 | — | 40 | 20 |
| | Specific SBR (SBR D) | 55 | 41.25 | 27.5 | 13.75 | — | 34.375 | 68.75 | — | 55 | — | 68.75 |
| | Natural rubber (RSS No. 4) | — | — | — | — | — | — | 20 | — | — | — | — |
| | Zinc oxide | 4 | 4 | 4 | 4 | 4 | 4 | 4 | 4 | 4 | 4 | 4 |
| | Stearic acid | 1.5 | 1.5 | 1.5 | 1.5 | 1.5 | 1.5 | 1.5 | 1.5 | 1.5 | 1.5 | 1.5 |
| | Carbon black (N 339) | 60 | 60 | 60 | 60 | 60 | 60 | 60 | 60 | 60 | 60 | 75 |
| | Aromatic oil | 5 | 5 | 5 | 5 | 5 | 5 | 5 | 16.25 | 8.75 | 1.25 | 23.75 |
| | Antioxidant (Sanloflex 13) | 1 | 1 | 1 | 1 | 1 | 1 | 1 | 1 | 1 | 1 | 1 |
| Second step | General purpose SBR (NIPOL 1502) | — | — | — | — | — | 25 | 30 | — | 60 | — | 30 |
| | Specific SBR (SBR D) | 13.75 | 27.5 | 41.25 | 55 | 68.75 | 34.375 | — | 27.5 | — | 82.5 | — |
| Cure | Sulphur | 2.54 | 2.54 | 2.54 | 2.54 | 2.54 | 2.54 | 2.54 | 2.54 | 2.54 | 2.54 | 2.54 |
| | Vulcanization accelerator (BS) | 1.38 | 1.38 | 1.38 | 1.38 | 1.38 | 1.38 | 1.38 | 1.38 | 1.38 | 1.38 | 1.38 |
| Properties of cured products | Resilience (Lupke rebound, 50° C.) (%) | 54 | 57 | 59 | 60 | 61 | 57 | 55 | 55 | 55 | 57 | 50 |
| | Wet skid resistance (Safety walk, 25° C.) | 101 | 100 | 101 | 103 | 100 | 100 | 99 | 101 | 99 | 97 | 108 |
| | Pico abrasion ($\times 10^{-3}$ cc) | 24 | 24 | 24 | 23 | 22 | 24 | 25 | 24 | 25 | 23 | 19 |
| | Tensile strength (Kg/cm$^2$) | 210 | 245 | 240 | 250 | 255 | 255 | 220 | 220 | 150 | 140 | 250 |
| | Elongation at break (%) | 460 | 520 | 495 | 450 | 440 | 450 | 520 | 515 | 350 | 320 | 480 |
| | 300% modulus (Kg/cm$^2$) | 125 | 125 | 130 | 154 | 156 | 151 | 115 | 113 | 151 | 155 | 125 |

TABLE 3-continued

| | | | | | | | | | | |
|---|---|---|---|---|---|---|---|---|---|---|
| Tan δ, 50° C. | 0.19 | 0.13 | 0.12 | 0.11 | 0.16 | 0.14 | 0.16 | 0.17 | 0.17 | 0.15 | 0.22 |

Note
Ex.: Example
Com. Ex.: Comparative Example

In Table 3, the resilience, wet skid resistance and tan δ were measured by the same method as used in said Experiments. The wet skid resistances are expressed by an index number on the assumption that the wet skid resistance in Comparative Example 8 is 100 in value. The Pico abrasion was measured by a Goodrich type Pico abrasion tester in accordance with ASTM D-2228 and a test for the tensile strength was made in accordance with JIS K-6301.

Figure 2:
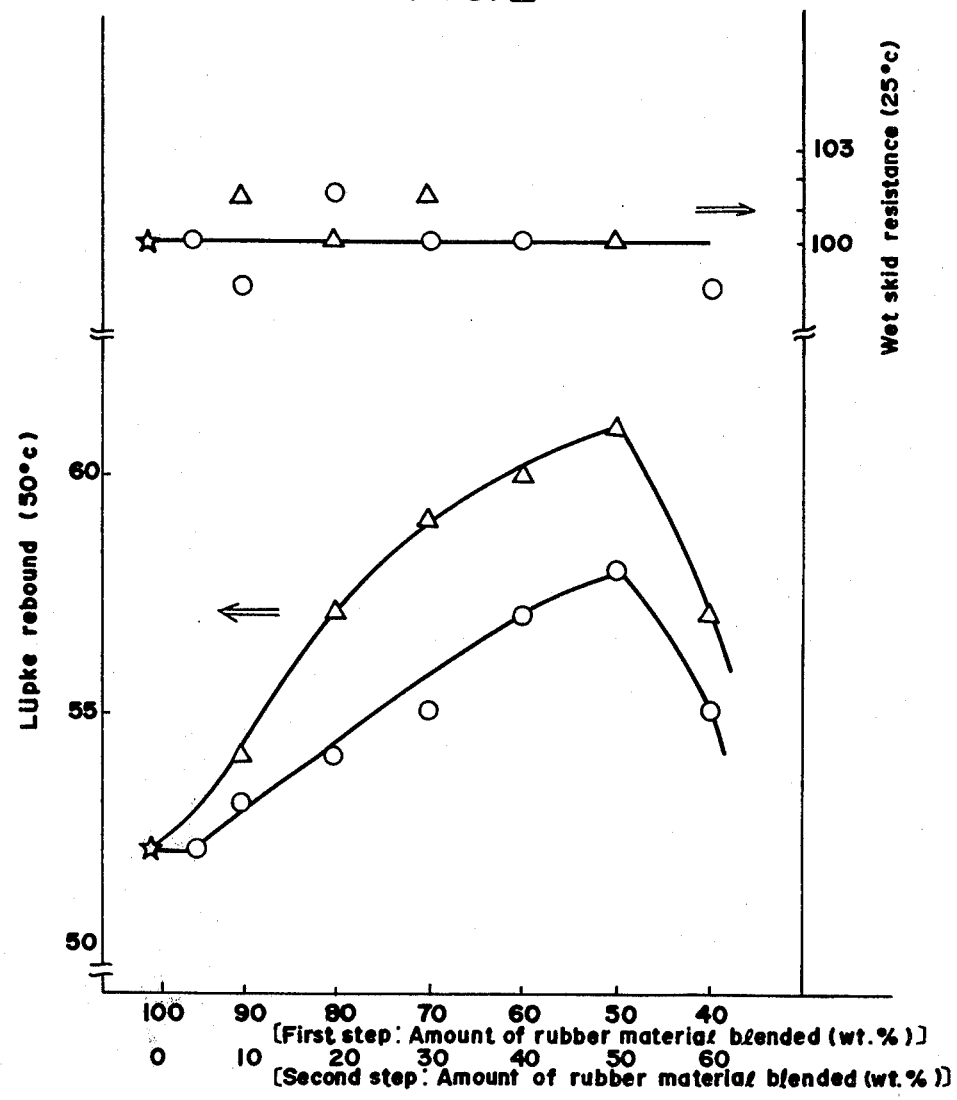

FIG. 2 shows the relationship between resilience (Lüpke rebound, 50° C.) and wet skid resistance in cases where the amount of rubber ingredients added in the first mixing step and the amount thereof added in the second step (the total of the rubber ingredients added in the two steps being always 100 parts consisting of 50 parts of the specific SBR and 50 parts of the general purpose SBR) were varied with respect to each other. In FIG. 2, the symbol Δ indicates the case where only the specific SBR was added in the second step, and the symbol o indicates the case where only the general purpose SBR was added in the second step. In addition, with respect to the point showing 40% of the rubber material added in the first step (60% of the rubber material added in the second step), the symbol Δ indicates the Lüpke rebound of a cured rubber product from a rubber composition comprising the general purpose and specific SBR's in the ratio of 40/60, and the symbol o indicates the Lüpke rebound of a cured product prepared from a rubber composition comprising such SBR's in the ratio of 60/40.

As is seen from Comparative Examples 5–9, Examples 8–20 and FIG. 2, the use of the specific two-step mixing method will clearly result in the production of cured rubber products having further increased Lüpke rebound and decreased tan δ as compared with those resulted from the use of the usual one-step mixing method. On the other hand, the wet skid resistance and wear resistance attained in the case where the one-step mixing method was used are substantially equal to those attained in the case of the two-step mixing method being used.

Further, it is clearly seen from FIG. 2, that a remarkable increase in Lüpke rebound and a remarkable decrease in tan δ will surprisingly be attained when the rubber ingredient used in the second step of the two-step mixing method is the specific SBR only (see the symbol Δ in FIG. 2) as compared with when the rubber ingredient so used is the general purpose SBR only (see the symbol o in FIG. 2). In the above cases, there will be substantially no changes in wet skid resistance and wear resistance.

In the two-step mixing method in which the total amount of the rubber ingredients used in the first and second steps is 100 parts by weight, it is necessary to use 10-less than 60 parts, preferably 20–50 parts, by weight of at least one rubber ingredient in the second step. The reason for this is that if at least 60 parts by weight of at least one rubber ingredient are used in the second step then up to 40 parts by weight thereof will necessarily be used in the first step, and if this amount of the rubber ingredient is incorporated at a time with 40–70 parts by weight of carbon black and attempted to be blended together in the first step then there will be incurred the disadvantages that the resulting mass is difficult to blend together by the use of a mixer such as a conventional Banbury mixer, remarkable heat generation is caused during the mixing thereby causing scorch of the rubber material, and the polymer is not dispersed well thereby to degrade the rubber properties such as resilience (Lüpke rebound) and tan δ (Comparative Examples 11–12 and FIG. 2). On the other hand, the use of more than 90 parts by weight of at least one rubber ingredient in the first step will not attain the mixing effect according to this invention (Comparative Example 10 and FIG. 2).

As previously mentioned, it is possible to greatly decrease the rolling resistance in tire treads without decreasing the braking performance thereof on wet roads by using the rubber composition of this invention in the preparation of the tire treads.

What is claimed is:

1. A rubber composition for tire treads which comprises:
   (I) 20–80 parts by weight, calculated as the rubber ingredient, of an extender oil-extended styrene-butadiene copolymer rubber having a Mooney viscosity ($ML_{1+4}$, 100° C.) of at least 53 prepared by extending a styrene-butadiene copolymer rubber having a styrene content of at least 20% by weight and up to 20% of 1,2-butadiene bonding units with an aromatic oil having a V.G.C. of 0.900–0.999 as the extender oil,
   (II) 80–20 parts by weight of at least one other diene rubber, the extender oil-free styrene-butadiene copolymer rubber and the at least one other diene rubber totalling 100 parts by weight, and
   (III) 40–70 parts of carbon black having an $I_2$ adsorption of 60–130 $mgI_2/g$ and a DBP absorption of up to 130 ml/100 g.

2. A rubber composition according to claim 1, prepared by incorporating more than 40 to 90 parts by weight of at least one rubber ingredient with the whole of the carbon black to mechanically mix them together in the first mixing step and then incorporating the thus mixed mass with the balance of the rubber ingredients to mechanically mix the whole mass together in the second mixing step.

3. In a method of preparing a rubber composition for tire treads, comprising (I) 20–80 parts by weight, calculated as the rubber ingredient, of an extender oil-extended styrene-butadiene copolymer rubber having a Mooney viscosity ($ML_{1+4}$, 100° C.) of at least 53 prepared by extending a styrene-butadiene copolymer rubber having a styrene content of at least 20% by weight and up to 20% of 1,2-butadiene bonding units with an aromatic oil having a V.G.C. of 0.900–0.999 as the extender oil, (II) 80–20 parts by weight of at least one other diene rubber as the rubber ingredient, the total of the rubber ingredients being 100 parts by weight, and (III) 40–70 parts by weight of carbon black having an $I_2$ adsorption of 60–130 $mgI_2/g$ and a DBP adsorption of up to 130 ml/100 g, the method comprising incorporating more than 40-to 90 parts by weight of at least one rubber ingredient with the whole of the carbon black to mechanically mix them together in the first mixing step and then incorporating the thus mixed mass with the balance of the rubber ingredients to mechanically mix the whole mass together in the second mixing step.

4. A method according to claim 3, wherein the balance of the rubber ingredients used in the second mixing step is 10-less than 60 parts by weight of the extender oil-extended styrene-butadiene copolymer rubber, calculated as the rubber ingredient.

* * * * *